(12) United States Patent
Patin et al.

(10) Patent No.: US 9,912,737 B2
(45) Date of Patent: Mar. 6, 2018

(54) METHOD AND SYSTEM FOR MODULAR INTEROPERABLE DISTRIBUTED CONTROL

(71) Applicants: David Lloyd Patin, Kingwood, TX (US); Saleem Stephen Bitar, Spring, TX (US); Raymond Donald Bartusiak, Houston, TX (US); Dennis J. Foltz, Spring, TX (US); Andrew J. Thake, Houston, TX (US); David L. DeBari, Pensacola, FL (US); Richard J. Caro, Arlington, MA (US); Dennis Lee Brandl, Cary, NC (US)

(72) Inventors: David Lloyd Patin, Kingwood, TX (US); Saleem Stephen Bitar, Spring, TX (US); Raymond Donald Bartusiak, Houston, TX (US); Dennis J. Foltz, Spring, TX (US); Andrew J. Thake, Houston, TX (US); David L. DeBari, Pensacola, FL (US); Richard J. Caro, Arlington, MA (US); Dennis Lee Brandl, Cary, NC (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 127 days.

(21) Appl. No.: 14/826,343

(22) Filed: Aug. 14, 2015

(65) Prior Publication Data

US 2016/0065656 A1 Mar. 3, 2016

Related U.S. Application Data

(60) Provisional application No. 62/042,374, filed on Aug. 27, 2014.

(51) Int. Cl.
*G06F 15/16* (2006.01)
*H04L 29/08* (2006.01)
*H04L 12/931* (2013.01)

(52) U.S. Cl.
CPC .............. *H04L 67/10* (2013.01); *H04L 67/12* (2013.01); *H04L 49/351* (2013.01)

(58) Field of Classification Search
CPC ....... H04L 67/10; H04L 67/12; H04L 49/354; H04L 49/351; H04L 29/08; H04L 12/931
See application file for complete search history.

(56) References Cited

U.S. PATENT DOCUMENTS

| 7,206,646 B2 * | 4/2007 | Nixon ................. | C10G 11/187 700/79 |
| 2009/0204458 A1 * | 8/2009 | Wiese .................. | G06Q 10/06 717/101 |

(Continued)

OTHER PUBLICATIONS

HI302 Hart/Foundation Fieldbus Interface, http://www.smar.com/en/product/hi302-hart-foundation-fieldbus-interface, downloaded from the internet on Jul. 7, 2015.

(Continued)

*Primary Examiner* — Cheikh Ndiaye
(74) *Attorney, Agent, or Firm* — Glenn T. Barrett (57) ABSTRACT

A distributed control system (DCS) for controlling an industrial process using a plurality of distributed control nodes (DCNs) can include a plurality of Device DCNs, each Device DCN including an I/O interface coupled with a field device for single channel input or output, a plurality of Application DCNs, and one or more Ethernet switches. The plurality of Device DCNs and the plurality of Application DCNs can be adapted to host a software runtime and communicatively coupled via the one or more Ethernet switches. The DCS architecture can include of two types of DCNs; Application DCNs and Device DCNs. The software (Continued)

runtime can be configured to selectively provide control application level communication and function block execution services.

8 Claims, 7 Drawing Sheets

(56) References Cited

U.S. PATENT DOCUMENTS

| | | | |
|---|---|---|---|
| 2011/0072506 A1* | 3/2011 | Law | H04L 63/1416 726/11 |
| 2011/0191500 A1* | 8/2011 | Odayappan | G05B 19/0426 710/8 |
| 2013/0030555 A1* | 1/2013 | Starr | G05B 23/0216 700/83 |
| 2015/0163151 A1* | 6/2015 | Li | H04L 47/2441 370/236 |
| 2016/0026813 A1* | 1/2016 | Neitzel | G06F 21/604 726/17 |

OTHER PUBLICATIONS

Fieldbus Foundation—DF51 HSE, http://www.fieldbus.org/index.php?option=com_mtree&task=viewlink&link_id=959&ffbstatus=Registered&Itemid=324, downloaded from the internet on Jul. 7, 2015.

Foundation for Remove Operations Management, http://www.fieldbus.org/images/stories/enduserresources/technicalreferences/documents/foundation_for_remote_operations_management, downloaded from the Internet on Jul. 7, 2015.

\* cited by examiner

| Advanced Applications (MVC controller, RTO, Procedural controller, Batch controller, ...) |
|---|
| DCN Service (Standard plus Application Faceplate Function Blocks) |
| General Purpose Operating System (Windows, Linux, RTOS ...) |
| Hardware |

Example of OL, OE, and Limits

METHOD AND SYSTEM FOR MODULAR INTEROPERABLE DISTRIBUTED CONTROL

CROSS-REFERENCE TO RELATED APPLICATIONS

This application claims priority to U.S. Provisional Application Ser. No. 62/042,374 filed Aug. 27, 2014, herein incorporated by reference in its entirety.

BACKGROUND

Field

The presently disclosed subject matter elates to methods and systems for distributed control of an industrial process. More particularly, the presently disclosed subject matter relates to a modular interoperable distributed control system.

Description of Related Art

Distributed control systems (DCS) are used for the control of industrial processes. In contrast to centralized control systems, distributed control systems include a plurality of control nodes distributed throughout the system. The first generation of DCSs (1970s to mid-1990s) consisted of mostly single supplier proprietary controllers, operator stations and engineering consoles connected to a shared network/bus. These early DCSs were designed to replace panel mounted single loop electric or pneumatic controllers. The DCS controllers handled a small number of control loops and I/O (typically between 8 to 50) requiring the development of complex redundancy schemes given that the scope of failure of a single DCS controller was significantly higher than that of a single loop controller. Depending on the DCS, the end user could connect a proprietary vendor supplied application computer or another supplier's general purpose computer only if the DCS supplier provided an interface for it.

The 2nd generation of DCSs (late 1990s to present) consisted of the same basic architecture with the replacement of some previously proprietary components by commercially available Ethernet switches connecting general purpose servers and workstations (usually running the Microsoft Windows operating system). These systems, however, still used a vendor supplied proprietary controller communicating through a proprietary application layer protocol running over the Internet Protocol (IP). More recent 2nd generation controllers can handle hundreds of control loops in a single controller.

In both the 1st and 2nd generation DCS systems, however, all I/O is physically bound to a single controller, limiting the usage of that I/O to only one single controller. In the current hierarchical DCS model, each I/O network is subordinate to a single controller. Once a controller is fully loaded, a project that adds a single field device must fund an entirely new redundant controller along with ancillary equipment and associated engineering. This can result in lost opportunity if the project is cancelled (because the rate-of-return falls below the cost of capital) or lowering return on capital employed if the capital is spent inefficiently.

Moreover, in the existing DCS market space, systems can lack interoperability because the end user lacks the freedom to incorporate any innovation directly into the DCS that does not come from the DCS supplier. This restriction can arise from the use of supplier proprietary application protocols which only allow devices and software from the supplier to be used by the DCS. Current control system architectures can: (1) lock the buyer into the hardware components available from a single vendor at a single point in time with limited opportunity to mix-and-match the best-of-breed, and (2) block an economically feasible path to upgrade as new and better components emerge in the marketplace. Encouraging a supplier to extend the life of aging and obsolete control system infrastructure does not necessarily create a differentiated competitive advantage (e.g. customers of the same supplier can also benefit from the same life extension). Furthermore, if one single customer jointly develops and funds the life extension R&D, it may serve as a competitive disadvantage to that customer. Today's DCS architectures can require periodic wholesale DCS replacement projects to move between generations of supplier technology. These replacement projects are expensive, lengthy and disruptive to ongoing operations.

Furthermore, many integrated petrochemical companies operate manufacturing facilities ranging from small polymer extrusion lines to world class, integrated refining and chemical complexes, yet use essentially the same DCS developed for the largest installation in those facilities. Older manufacturing facilities without access to advantaged feedstocks will be challenged to remain competitive as new capacity comes online that exploits economies of scale, integrates modern energy efficient process & equipment technologies, aligns conversion capacity with forecast market demand and integrates state-of-the-art automation technology Profit-enabling application software is often delivered on the operations management level (ISA95 level 3) where the network and computing appliances are open and accessible to any third party software developer. The benefits realized from applications built on today's closed, proprietary systems can thus be limited to the resources and capabilities of the supplier and buyer. In addition, closed, proprietary architectures can diminish the incentive for third party software development and therefore a buyer's access to best-of-breed technology through an open applications marketplace.

Accordingly, there is a desire for a DCS that can economically scale in any direction, small or large, and that can flexibly incorporate innovative applications faster across disparate manufacturing lines, in accordance with an exemplary and non-limiting embodiment, a modular, interoperable DCS architecture can include of two types of Distributed Control Nodes (DCNs); Application DCNs and Device DCNs connected to a high speed Layer 3 Ethernet switch fabric using the IP protocol. An industry standard service/software runtime called the "DCN Service" is resident on all DCNs providing all control application level communication and FBD execution services.

SUMMARY OF THE INVENTION

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings. To achieve these and other advantages and in accordance with the purpose of the disclosed subject matter, as embodied and broadly described, the disclosed subject matter includes systems and methods for modular interoperable distributed control.

In accordance with one aspect of the disclosed subject matter, a system for controlling an industrial process using a plurality of distributed control nodes can include a plurality of Device DCNs, each Device DCN including an I/O interface coupled with a field device for single channel input or output, a plurality of Application DCNs, and one or more Ethernet switches. The plurality of Device DCNs and the plurality of Application DCNs can be adapted to host a software runtime and communicatively coupled via the one or more Ethernet switches. The software runtime can be configured to selectively provide control application level communication and function block execution services.

As embodied herein, each of the Device DCNs can include a system on a chip including an embedded operating system operable to execute one or more device applications and host the software runtime. The applications can include regulatory controls or general applications such as a device historian or control loop performance monitor. The Device DCNs can include I/O interfaces for one or more protocols (e.g. legacy 4-20 mA analog, HART, discrete, or ASi I/O channels). At least some of the plurality of Device DCNs can include a wireless gateway interface.

In certain embodiments, each of the Application DCNs can include a general purpose computer including a general purpose operating system operable to execute one or more advanced applications and the software runtime. The Ethernet switches can be adapted to provide VLAN routing and Quality of Service.

As embodied herein, the software runtime can be configured to use a standard set of Control and I/O function blocks, and a plurality of the Device DCNs and the Application DCNs can implement one or more distributed control applications by communicating via network middleware. The control application can be based upon industry standard function block models including but not limited to IEC 61499, IEC 61804, and IEC 61158-2. The control application can also be based upon a textual industry standard programming language such as IEC 61131-3 Structured Text or a general purpose programming language including but not limited to FORTRAN, Basic, C, c++, C#, and Java. The control applications can be integrated with external systems according to IEC 6226.4. The advanced applications can include applications for multi variable control, real-time optimization, procedural control, batch control, human machine interfacing, asset management, and abnormal event detection.

In accordance with another aspect of the disclosed subject matter, a Device DCN for use in a distributed control system having a plurality of nodes can include an I/O interface coupled with a field device for single channel input or output. The device can include one or more processors adapted to host a software runtime connected to an Ethernet switch and execute one or more I/O or Control function blocks. The software runtime can be configured to communicate with one or more of the plurality of nodes of the distributed control system, via the Ethernet switch, and use a standard set of Control and I/O function blocks, to implement a distributed control strategy.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the disclosed subject matter. Together with the description, the drawings serve to explain the principles of the disclosed subject matter.

DETAILED DESCRIPTION

As noted above, methods and systems disclosed herein include a modular interoperable distributed control system for distributed control of an industrial process. Generally, for purpose of illustration and not limitation, a DCS in accordance with the disclosed subject matter can include fully distributed control, an interoperable and interchangeable "application" system model based on International Standards, and visibility into control, process, and equipment.

In accordance with one aspect of the disclosed subject matter, a system for controlling an industrial process using a plurality of distributed control nodes can include a plurality of Device DCNs, each Device DCN including an I/O interface coupled with a field device for single channel input or output, a plurality of Application DCNs, and one or more Ethernet switches. The plurality of Device DCNs and the plurality of Application DCNs can be adapted to host a software runtime and communicatively coupled via the one or more Ethernet switches. The software runtime can be configured to selectively provide control application level communication and function block execution services.

Reference will now be made in detail to the various exemplary embodiments of the disclosed subject matter, exemplary embodiments of which are illustrated in the accompanying drawings.

Figure 1A:
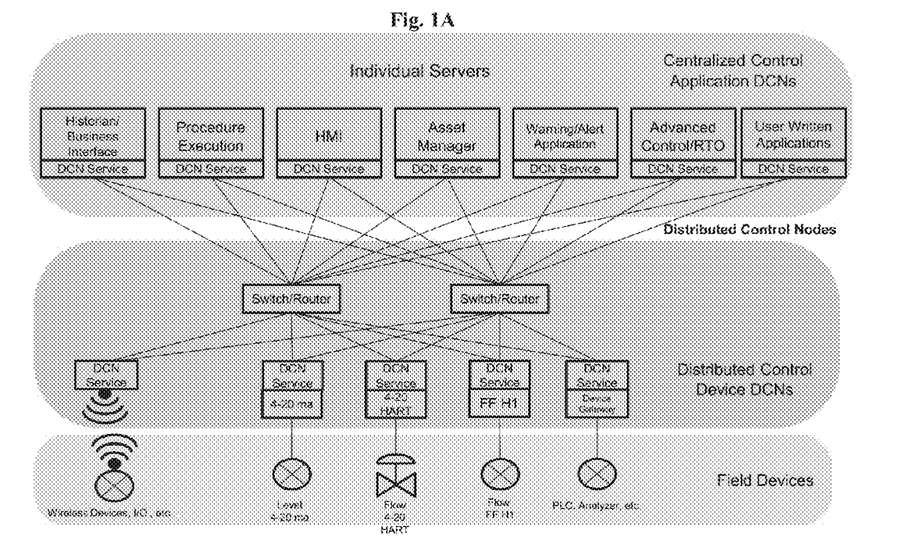
FIGS. 1A and 1B are schematic representations of a modular, interoperable DCS in accordance with certain embodiments of the disclosed subject matter.
Figure 1B:
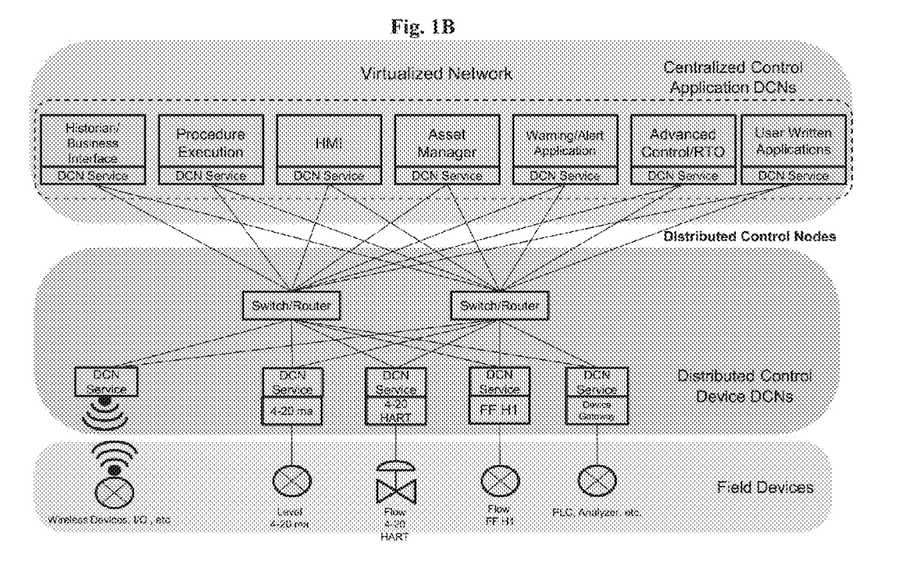

In accordance with an exemplary and nonlimiting embodiment, with reference to FIGS. 1A and 1B, a modular, interoperable DCS architecture can include of two types of Distributed Control Nodes (DCNs); Application DCNs and Device DCNs connected to a high speed Layer 3 Ethernet switch fabric using the IP protocol. An industry standard service/software runtime called the "DCN Service" is resident on all DCNs providing all control application level communication and FBD execution services.

High Speed Ethernet Layer 3 IPV6 Switching Fabric:

The central core of the DCS can be based on a Layer 3 switched Ethernet IP network with all network end points hosting the DCN Service. The DCN Service can incorporate all the communication and control capabilities required for a modern DCS. This combination of communication and control incorporating a standard set of Control and I/O function blocks create, in a sense, a virtual controller operating system kernel.

The combination of Layer 3 switching, VLANs and QoS can allow for network implementation flexibility/segmentation and can be used in all DCS switches. The network switch can incorporate many security enforcement functions since the network fabric is the one place where all end point devices interact and all messages can be examined centrally rather than at each end point. Such security enforcement functions implemented in the network switch can include, but are not limited to: Policy based networking. End point device authentication, Deep packet inspection (firewalling), and DCN to DCN association validation. Given the low power requirements of today's System On a Chip, Power over Ethernet (PoE) can, in certain embodiments, allow the network switch to power the DCS Device DCN. Every field device can have an IP address in the DCS and as a result, IPv6 can be used since it supports a very large address space.

Figure 2:
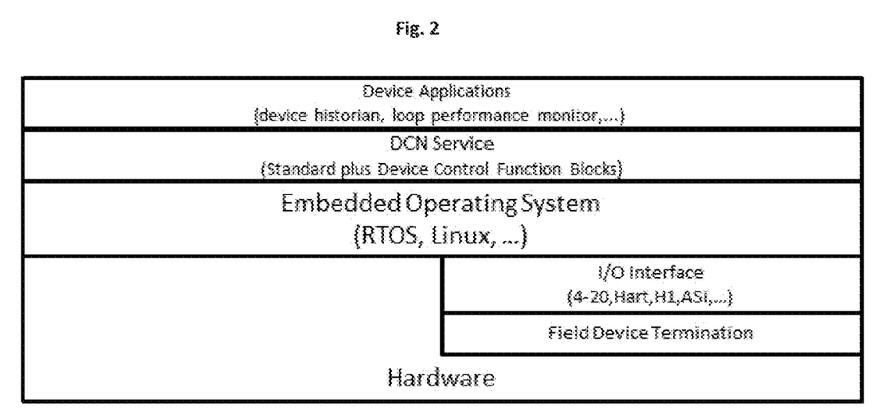
FIG. 2 illustrates an exemplary software stack of a Device DCN in accordance with the disclosed subject matter.

Device DCN:

The Device DCN can serve as the I/O interface and regulatory controller of the DCS. It can directly connect to field devices such as transmitters, valves, switches, etc. The Device DCN is essentially a single channel I/O and control and application processor responsible for a single field input or output. An I/O channel can be existing legacy 4-20 mA analog, HART, discrete, ASi, etc. Because the Device DCN hosts a DCN Service, any standard function block control strategy can be implemented in any Device DCN and Device DCNs can operate in a peer to peer relationship with other Device or Application DCNs. The Device DCN can be installed in a conventional controller cabinet in an existing control center, a remote instrument shelter or a field junction box (with proper form factor and area classification certification). The Device DCN can use existing field wiring and field devices (transmitters, valves, etc.), or can be installed as part of a green field project using the latest smart digital instrumentation. An exemplary software stack of a Device DCN in accordance with the disclosed subject matter is provided in FIG. 2.

The combination of the low cost and computing power of a System On a Chip (SOC) running a modern Real-time Operating System (RTOS) hosting a DCN Service connected to a modern, redundant Layer 3 switched Ethernet, can essentially put the power of a traditional DCS controller on every single field device without having to replace the device or the field wiring. Because each channel can have its own controller, there is no need for complex and costly redundancy schemes—only the network requires redundancy. Single loop control, integrity and reliability can thus be obtained. An existing field device such as a HART enabled valve can get much of the benefit of a Foundation Fieldbus H1 valve, without requiring valve or positioner replacement, expensive field infrastructure and wiring upgrades. When the time comes to replace a field device, the Device DCN can be reconfigured to interface with the upgraded field device while the existing field wiring can likely be reused.

Complex field devices such as PLCs and process analyzers utilizing protocols such as Modbus, Profibus, CIP, and embedded OPC UA can utilize a Device DCN gateway which has additional interface hardware and software for those protocols but exposes these devices just like any other Device DCN via standard function blocks.

Field devices utilizing wireless networks can be integrated with Device DCNs embedded in wireless gateway interfaces while still having the same controller functionality of the wired Device DCN though at considerably slower execution rates. Wireless gateway DCNs also provide network security control point functions.

The Device DCN can host added functionality with the incorporation of device applications embedded in the Device DCN such as embedded historians and loop performance monitors acting on data local to the Device DCN.

Application DCN:

The Application DCN can host the centralized, advanced applications of the DCS. Any operating system that can host the DCN Service can be used as an Application DCN. Any computing platform, physical or virtual, that can host the Application DCN's operating system can be used. Application DCNs can therefore run on systems ranging from servers in a high-availability real-time data center with Network Functions Virtualization (NFV) with or without Software Defined Networking (SDN) (FIG. 1B) to redundant embedded computers hardened for harsh field environments (FIG. 1A) NFV is a network architecture concept that uses the technologies of IT virtualization to virtualize entire classes of network node functions into building blocks that may be connected, or chained, to create communication services. A virtualized network function, or NFV, may consist of one or more virtual machines running different software and processes, on top of standard high-volume servers, switches and storage, or even cloud computing infrastructure, instead of having custom hardware appliances for each network function. SDN architectures decouple network control and forwarding functions, enabling network control to become directly programmable and the underlying infrastructure to be abstracted from applications and network services. As used in this application, "high availability" is meant to mean a minimum availability of 99.999% and more preferably 99.9999%.

Figure 3:
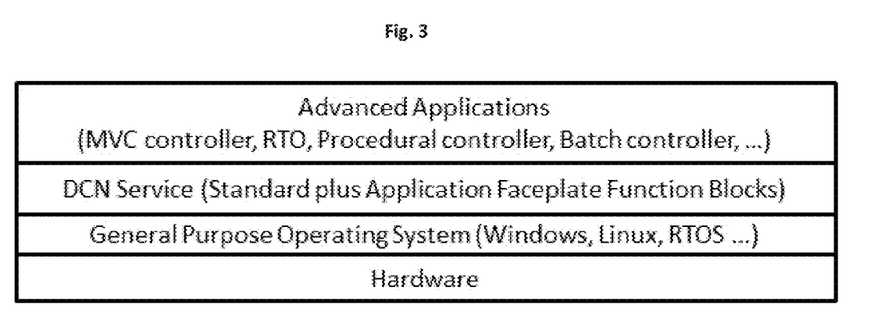
FIG. 3 illustrates an exemplary software stack of an Application DCN in accordance with the disclosed subject matter.

Given the wide range of platforms available, the selection of a specific computing platform or operating system can be guided by the implementation requirements of a specific advanced application, as disclosed herein. Additionally or alternatively, software "legacy shims" can be employed to provide interfaces for legacy applications (such as OPC Classic clients) that do not have a native DCN Service interface. Since all Application DCNs can host a DCN Service, any standard function block control strategy can be implemented in any Application DCN. Application faceplate function blocks can be used to expose a virtual function block interface for the advanced applications hosted in the Application DCN and operate in a peer to peer relationship with standard function blocks in any other Device DCN or Application DCN. An exemplary software stack of an Application DCN in accordance with the disclosed subject matter is provided in FIG. 3.

Advanced applications hosted by Application DCNs can add value to the business by enabling better automation and optimization. Because advanced applications can be supplied by any vendor, Engineering Tool Container plugins for each advanced application can be provided. In certain embodiments, Engineering Tool Container plugins can integrate into a single engineering tool that provides a consistent engineering user interface for all DCN Service applications. Examples of advanced applications include, but are not limited to:

End user developed application execution
IEC 61131
IEC 61499
General purpose compiled and interpreted (script) languages
Supplier proprietary or legacy languages
Vendor supplied applications
Real Time Optimization
Linear and non-linear multivariable controllers
Batch controllers—ISA 88
Procedural controllers—ISA 106
Alarm and Event Management
OPC servers (classic and UA)

Asset Health Monitoring
Business System Integration
B2MML message queuing for transactional applications—ISA 95
Enterprise Historian
Engineering Tools:

A modular, interoperable DCS can require many different advanced applications to add value to manufacturing operations. These applications can be supplied by many suppliers provided they plug into either the Application or Device DCN Service architecture reference. An overall Engineering and System Management Tool Container application can be provided to host the central engineering repository database and advanced application tool plug-ins. Some engineering tool plug-ins can be designated as mandatory in order for a basic system to function, while others can be added based on the needs of the specific manufacturing plant allowing installations to scale to fit both small and large facilities. Some examples of engineering tool plug-ins include a FBD editor/loader, Application and Device DCN node management, a centralized log browser, and security tools. Security tools can include pluggable authentication modules (account/password, biometric, token, smartcard, etc.), role based object access, M2M associations/Firewall rules and out of band security configuration (network join key, etc.).

Figure 4:
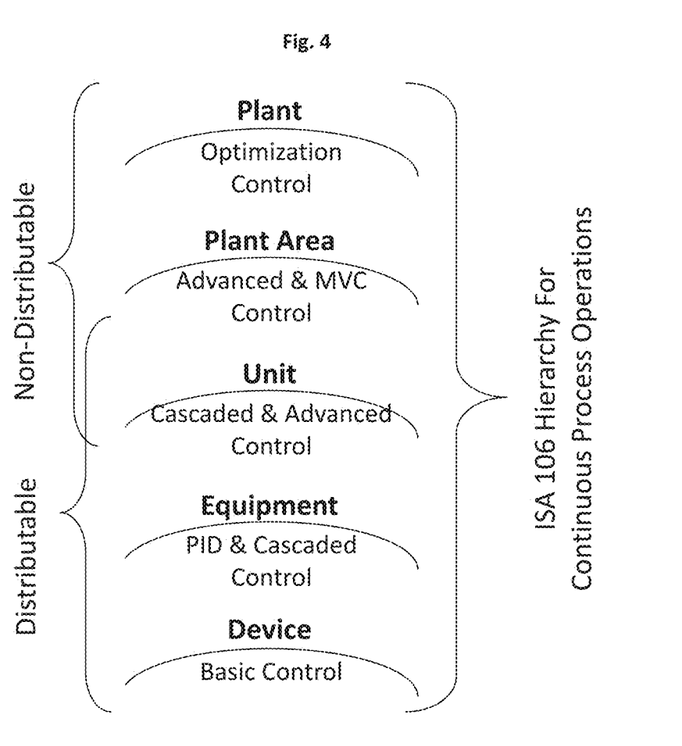
FIG. 4 illustrates an example hierarchy of control strategies organized using the ISA 106 hierarchy for continuous process operations.

Reference will now be made, for purpose of illustration and not limitation, to the functional characteristics of a DCS as embodied herein. As disclosed herein, the functional characteristics of a DCS in accordance with the disclosed subject matter can be based on an assumption of a hierarchy of control strategies. Each higher level in the hierarchy typically has a larger scope of control, larger scope of information, and longer system response time than its lower levels. Therefore each higher layer of the hierarchy operates with a longer interval of planning and execution time than its immediately lower layer. A typical hierarchy can include basic control, PID control, cascaded control, multi variable control, model predictive control, real time optimization, and the like. FIG. 4 illustrates an example hierarchy of control applications organized using the ISA 106 hierarchy for continuous process operations.

The software runtime can be configured to use a standard set of Control and I/O function blocks. The Device DCNs and the Application DCNs can implement one or more distributed control applications by communicating via network middleware. The control applications can be based upon industry standard function block models including but not limited to IEC 61499, IEC 61804, and IEC 61158-2. The control applications can also be based upon a textual industry standard programming language such as IEC 61131-3 ST or a general purpose programming language including but not limited to FORTRAN, Basic, C, C++, C#, and Java.

Figure 5:
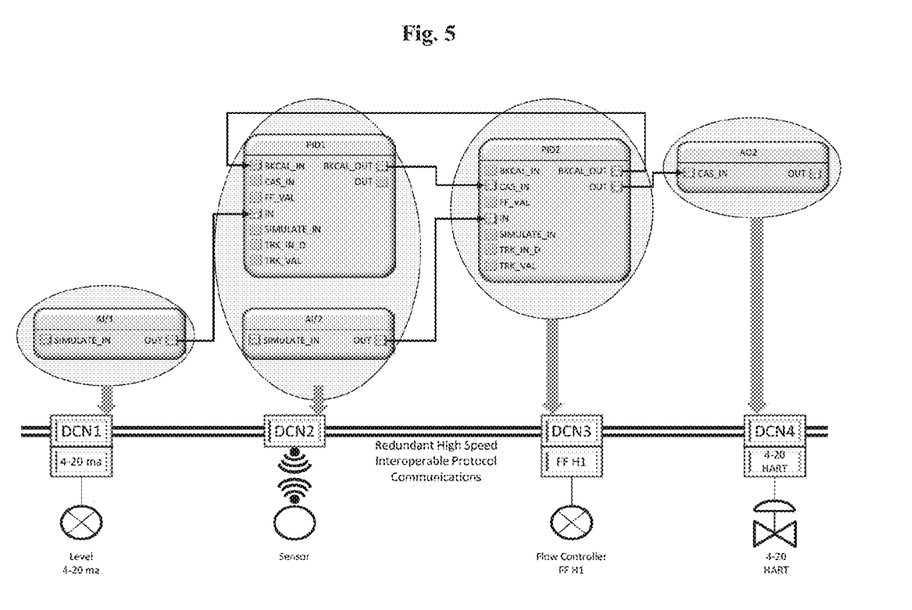
FIG. 5 illustrates an exemplary distribution of control strategies in accordance with the disclosed subject matter.

The subject matter disclosed herein can include a DCS architecture defined based on distributable control using existing international standards. FIG. 5 illustrates an exemplary distribution of control strategies in accordance with the disclosed subject matter. This architecture can break the "only-one-controller-owns-the-I/O" model of a conventional DCS.

In the hierarchy of control strategies, the lower levels can be configured using standards such as the international IEC 61499, IEC 68104, and Fieldbus Foundation IEC 61158-2 HSE function block format. A distributed system can include Distributed Control Nodes (DCNs) on a redundant high-speed communications channel (backbone or network). As embodied herein, there is no requirement to explicitly configure communication between nodes; the configuration and design environment can automatically include any necessary communication between the DCNs. Function block strategies can be distributed in many different models. Examples include the Fieldbus Foundation HSE models and the Fieldbus Foundation's ROM (Remote Operations Management) models. Standards such as FF HSE define not only a communication protocol, but also a model for fully distributed control. In the example illustrated in FIG. 5, a cascaded control loop can be distributed into four DCNs, with a final stage of configuration being the assignment of a function block to a DCN for execution and no explicit intervening communication blocks.

Higher level control strategies are often purchased as third party or vendor developed packages using other methods, such as C, C++, C#, Java, FORTRAN, and Visual Basic, or specific products such as LabView, MATLAB, or GNU Octave. The system disclosed herein can be defined in such a way that higher level control strategies can be integrated using a middleware protocol standards such as the IEC 62541 (OPC-UA) standards.

The automation system can also integrate with other operational systems and with business systems. The architecture subject matter can be defined in such a way that integration with other systems can be integrated using the IEC 62264 (ISA 95 and B2MML) standards.

In accordance with the disclosed subject matter, all I/O has control capabilities. A Distributed Control Node (DCN) can contain the communications, computing and memory capability to execute control elements in a distributed environment. Other, dedicated elements, can participate in the control strategies, for example, but not limited to using Foundation Fieldbus HSE or OPC-UA protocols. The entire system can be segmented and protected following standards such as the IEC 62443 Cyber System Security standards for zones and conduits.

Figure 6:
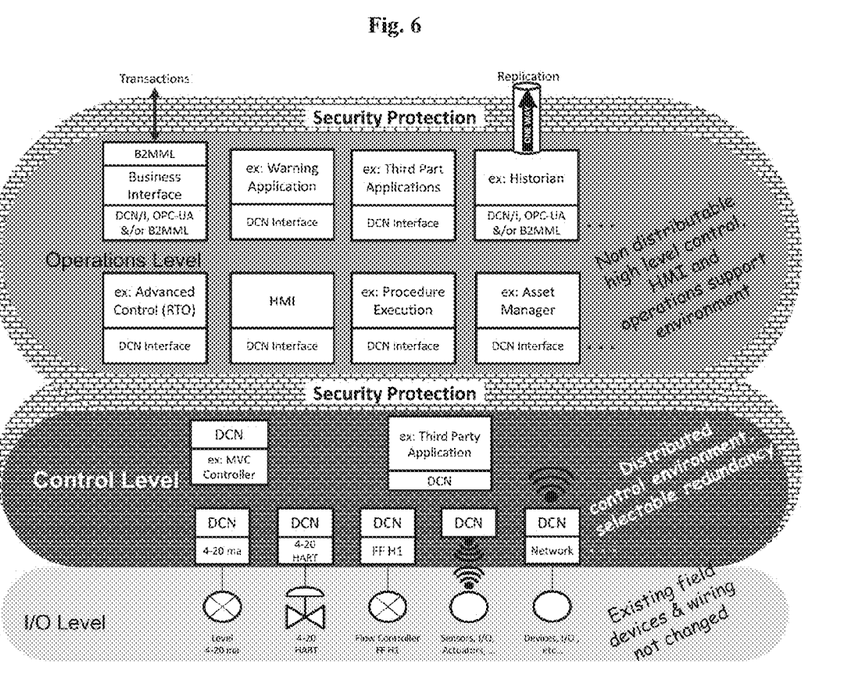
FIG. 6 illustrates an example of a DCS in accordance with the disclosed subject matter utilizing elements based on existing technologies.

In accordance with an exemplary embodiment, the elements in the DCS can be based on existing standards and existing technologies. Control can thus be provided at a low level, such that any failure can have reduced impact, that single loop integrity is ensured, and that controller hardware upgrades can be performed on-process with minimal impact to operations. FIG. 6 illustrates one example of a DCS in accordance with the disclosed subject matter utilizing elements based on existing technologies:

Using Foundation Fieldbus USE (or an equivalent interoperable standard) those parts of the control strategy hierarchy that are distributable.

Using OPC-UA (or an equivalent) for communication for those parts of the control strategy that are not distributable.

Using ISA/95-B2MML for configuration exchanges and integration with business systems and other transactional operational systems, with communications through a secure communications channel.

With security protection built into the architecture of the nodes and networks.

Wireless systems, such as ISA 100 and Wireless HART, when wireless is needed, to meet industrial security and redundancy requirements.

The techniques disclosed herein can provide for fully distributed control, provide an interoperable and interchangeable system model, information integration, and access and security. For purpose of illustration, and not limitation, exemplary characteristics a DCS in accordance with the disclosed subject matter will now be described with reference to these features.

Fully Distributed I/O:

A system in accordance with certain embodiments can sit on top of existing field devices and can preserve the field device/wiring. This can reduce the cost of re-wiring and to take advantage of technology trends regarding greater capability of digital instrumentation and distributed control. Wiring costs and wiring changes can be significant cost elements of any project. This characteristic can reduce the need for wiring changes during system installation or replacement and can permit much faster validation and startup.

In accordance with certain embodiments, I/O need not be "owned" by a single controller, but can be assigned to any control strategy independent of where the strategy is being executed. The ultimate realization of this characteristic is that the system can combine I/O and control processing into a single per I/O channel processor for fully distributed control and single loop integrity, allowing execution of regulatory control at the lowest possible level, constrained only by compute-time, memory-size, and network throughput. This characteristic can provide the functionality and value of control in the field, without having to change the existing field instruments or wiring. In certain embodiments, the I/O controller can allow for implementation in RIE (Remote Instrument Enclosures), JB (Junction Boxes), and Central Control Terminal Rooms. Allowing each I/O channel its own processor executing control function blocks allows for flexibility to move basic control processing to the I/O resulting in fewer monolithic, high I/O density DCS controllers and the minimization of complex redundancy schemes which have been the source of process upsets and shutdowns. Moreover, this characteristic can allow most control strategies to be implemented at the lowest level of the control hierarchy in a robust real-time system and not be forced to put it into less reliable higher level systems, or not implemented at all because of controller concerns.

In certain embodiments, distributed control strategies can be implemented using industry standard function blocks that are compatible with industry standards such as IEC 61499 and IEC 61804. Control strategies shall be operable at multiple hierarchical levels of control (See FIG. 4). Control strategies as disclosed herein include, but are not limited to, regulatory control, advanced regulatory control, sequential logic (programs written in IEC 61131-3 compliant language or ANSI/ISA-88.00.02 (ISA-106) compliant language), model-based estimation/control (linear quadratic gaussian/linear quadratic regulator, state estimator, model predictive control), and algorithms defined in high level languages. This characteristic can allow for relocation of control strategies (function blocks) to the appropriate level as requirements dictate without having to re-write in some different controller specific language because it needs to run in a different controller platform.

In certain embodiments, the system can be configured to detect, interrogate, configure, enable and document new field devices including input/output addresses automatically, based solely on the tagname of the field device. Replacing a failed instrument with an interchangeable model thus need not require engineering involvement. Instrumentation maintenance, wiring changes, and I/O maintenance can significant costs in highly automated systems. Replacing failed instruments today often requires engineering involvement to reconfigure multiple different systems, even for a direct replacement part. In certain embodiments, the system disclosed herein can automatically load the appropriate DD file to a newly discovered device, without the need for DD (Device Definition—EDDL IEC 61804) management required by engineering personnel. Replacement can be simple enough for any level of technician to perform. This can also minimize the difficulty in dealing with different revisions of smart transmitters when a technician replaces a transmitter with a different revision.

Interoperable and Interchangeable System Model:

In certain embodiments, the system can use an interoperable and interchangeable industry standard protocol that supports both distributed control and communication. This can allow use of any supplier that conforms to the standards, and adaptation of the system to use best in class products.

In certain embodiments, the system can also allow third party connected appliances that implement connections to industry standard wired or wireless networks for the purposes of data exchange, such as, ASi, DeviceNet, Profibus, ISA 100, Wireless HART, and the like.

In certain embodiment, all controllers can be adapted to run an industry standard function block algorithm set (e.g. the basic and extended function blocks defined by the Fieldbus Foundation. Additionally or alternatively, the system can provide a user programmable calculation function block based on an industry standard control language, such as IEC 61131-3 Structured Text (ST). As embodied herein, function block based control strategies can be exportable and importable using industry standard formats.

In certain embodiments, the programming environment can provide a standard based method for access of I/O, historical and "other" data (e.g. Lab values) for use in calculations with appropriate signal validation and time-stamps. Additionally, a provable means can be provided to test and validate changes to the system (including configurations, interfaces, programming, and the operators' ability to use), before a change to the system is commissioned. For example, this can include a full system simulation capability that can operate from real-time live information and provide a comparison of the updated system's outputs (including changes) versus the outputs of the current system.

In certain embodiments, the process automation system can provide means to integrate user-written or third-party applications so that they operate in a manner that is equivalent to intrinsic functions (with respect to functionality and performance). For example, an interface can be provided to expose third-party applications, which could be written in languages such as Structured Text Language, C, C++, C#, Visual Basic, Java, or FORTRAN, as function blocks. In certain embodiments, duplication of databases within the process automation system and between systems connected to the process automation system, including the enterprise business system, which require separate configurations and tag/name maintenance, can be reduced. For example, replication of database content between enterprise and automation systems can be acceptable if it does not involve separate configuration and maintenance of tag/name objects. Additionally or alternatively, replicated databases can implement different access controls.

Information Integration:

In certain embodiments, the system can include a human-machine interface (HMI) that integrates data from any source in the automation system, and presents it in a consistent manner, independent of the source of the information, without the need to configure "shadow tags" in order to bring external information into the HMI. All information and events can be exposed through an industry standard interoperable interface to allow for any HMI that supports the interface.

Figure 7:
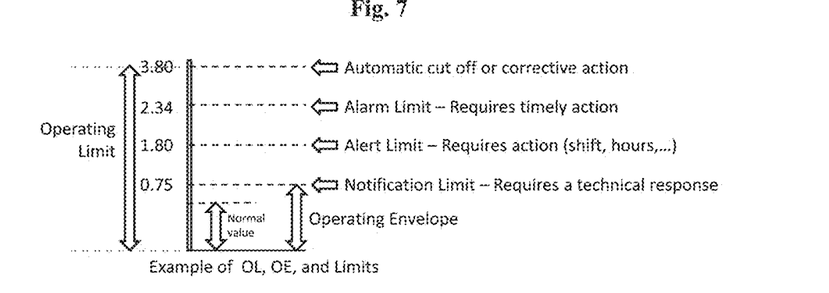
FIG. 7 illustrates an exemplary scheme for operating limit (OL), operating envelope (OE), alarm, alerts, and notifications in accordance with certain embodiments of the disclosed subject matter.

In certain embodiments, the system can include a rule based alarm/alert/notification implementation, such that the system can calculate or suppress an alarm/alert/notification based on conditions, values, limits, historical information, system state, etc from any source of data, and conform to an industry standard, such as ISA 18.2. For purpose of illustration, and not limitation, FIG. 7 illustrates an exemplary scheme for operating limit (OL), operating envelope (OE), alarm, alerts, and notifications.

In certain embodiments, the automation system can include a means for interoperable exchange of structured and unstructured data among operations level applications and between the operations and business computing systems. For example, standards such as ISA-95 Part 2 and Part 4 can implement this characteristic. Examples of tools for interoperable exchanges include Enterprise Service Busses (ESB), enterprise messaging, web services, XML, B2MML.

In certain embodiments, the system can be configured to historize any and all data, at a configurable frequency and duration appropriate for each item, and configured at object build time. For example, during configuration an engineer can decide what data is historized, without requiring configuration through a separate tool. Additionally or alternatively, the system can include an interoperable interface to support external collection for longer-term historization of data. The system's means for storing, exchanging, and historizing data can be equivalent for data produced by measurement or by calculation integrated with the engineering configuration toolset. For example, data used for intrinsically stabilizing or regulatory control can be available within tens of milliseconds of its measurement or calculation. Data for monitoring-only purposes can be available at the appropriate frequency required by the application utilizing the measurement or calculation. The system can also be configured to historize both time series and event oriented data, and can be configured to historize data at dynamic rates based on events. For example, the system can collect 5 minutes of data at high speed, and only preserve the high speed data in the case of a specific event, otherwise preserve long term data at a slower rate. (e.g. a "flight data recorder" for processes.). In certain embodiments, the system can collect both data values and the context of the data. The context can include the batch step, current system state, annotation, product grade, or other information that can be used to perform run-to-run comparisons. The system can also provide a mechanism for any tag/name changes in a lower level historian to be automatically propagated to higher level systems.

Access and Security:

In certain embodiments, the system can include support for interchangeable authentication mechanisms for both devices and humans. Devices connected to the Distributed Control Network can be authenticated prior to allowing communication. In certain embodiments, 2-factor authentication for HMI can be utilized.

In certain embodiments, the Distributed Control Network can communicate using standards based secure and deterministic protocols within the Control Level. For example, all inter-application communication within the Control Level can conform to the same protocol(s) and standards.

In certain embodiments, all actions and/or messages that result in a process state or configuration change can be authenticated, have some form of tamper protection, and be logged. It is important that the system is able to record changes, the source of the changes and verify the change is authorized and uncompromised. Additionally, in certain embodiments, the system can be configured to track "normal" communication patterns and warn using Alarms/Alerts/Notifications deviations from the norm which may indicate cyber events. For example, in a deterministic system non-typical traffic patterns can be an indicator of compromise.

In certain embodiments, applications executing within a Distributed Control Node can be "sandboxed" such that any failure or compromise of a single application does not allow compromise or failure of the node or other applications executing on it. Application isolation can allow for prescribed/authorized communication with the OS and underlying component without exposing parallel processes. Applications executing within a Distributed Control Node can also be "signed" such that, if enabled, changed application code would not be allowed to execute until re-signed. In some areas, Application change management is a rigorous process. The option to selectively sign certain applications where risk justified can help to compliment and manage existing manual work processes.

In certain embodiments, the Distributed Control Nodes can be adapted to allow for online patching of software and/or firmware without impact to the I/O Level, Control Level or Operations Level. Patching, including Firmware Patching, has become a routine task, as patching is the most effective method for removing a known vulnerability. The system can thus allow for patches to be delivered, installed, and placed into effect securely and without downtime.

The disclosed subject matter provides a modular, interoperable, and open DCS architecture. As disclosed herein, a DCS can include a System-of-Systems Architecture (SoSA). In accordance with certain embodiments, the disclosed subject matter can make use of open, publically available industry standard interfaces specifying physical connections, power, data, and the like, as welt as use of an open, publically available industry standard function block algorithm set and custom programming language. The disclosed subject matter can provide for modular single-channel I/O with control & application processing capability and selectable channel-by-channel redundancy and a flexible network design that allows users to define scope of network failure, network segmentation, and network security zones. Moreover, the disclosed subject matter can utilize General Purpose Computing Power with no physically connected I/O and a data-centric middleware open standard to enable application interoperability (i.e. use of an industry standard data model that includes contextual information).

As disclosed herein an interoperable open architecture based on industry standards can provide:

More technological innovation

Reduced system procurement and lifecycle cost

Increased incentives and a lower barrier to entry for new market entrants (e.g. small scale startups)

Reduced component development fine

Low-cost integration of new or improved components, allowing the addition of new functionality or replacement of obsolete components without significant cost barriers Obsolescence and maintenance upgrade will be open to competition as the original supplier will not have a monopoly on future integration Component interoperability through common data models and service bus technology allows applications to share both services and data Portability of software achieved through the use of an industry standard language allows the code to be moved between different compiler-hardware-operating system environments. This allows a central engineering organization to adopt a build-once, use-everywhere strategy and a manufacturing facility to readily share code with other facilities even if they use different systems.

Use of industry standard network communication protocol to reduce the complexity of connecting and/or replacing third party devices and/or systems.

The disclosed subject matter's utilization of modular general purpose computing can provide for opportunistic upgrading without the cost hurdle associated with migrating field wiring and porting applications. This can open up the control network to high horsepower advanced multivariable applications that require either high frequency measurements or high availability. Accordingly, the disclosed subject matter can provide a scalable system that can incrementally grow processing capacity with the size and complexity of the manufacturing facility.

Additionally, in accordance with the disclosed subject matter, modular, single-channel I/O with control and application processing capability can provide the following benefits:

Can be mounted in a marshalling area in place of "dumb" terminal blocks and significantly reduce the number of expensive redundant general purpose controllers, equipment room "real estate" and ancillary equipment (e.g. HVAC, power, UPS, etc)

Eliminates the need for complex and costly redundancy schemes (except for the most critical of loops) through single loop integrity so that no individual processor failure can affect more than one regulatory control loop.

Allows a field project's I/O to be added at very low incremental cost, thereby increasing the project's rate-of-return Allows any controller to read from or write to any I/O regardless of where it is physically connected into the system. This effectively makes traditional marshalling rack cross-wiring a virtual software exercise which translates into faster, lower-cost control system installation and lifecycle flexibility (although certain architectures designed to tightly limit scope of failure will introduce more system latency).

Eliminates wholesale DCS replacement projects in favor of treating the replacement and upgrade of modular components as a standard maintenance activity (much lower cost and far less operationally disruptive).

Provides the flexibility to distribute applications when advantageous to do so. Possible distributed applications include: process & event history, control loop performance monitoring, device diagnostics, and field instrument plug & play.

While the disclosed subject matter is described herein in terms of cc am exemplary embodiments, those skilled in the art will recognize that various modifications and improvements can be made to the disclosed subject matter without departing from the scope thereof. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A modular and interoperable distributed control system for controlling an industrial process using a plurality of distributed control nodes, comprising:
   a Layer 3 switched Ethernet IP network;
   a plurality of Device DCNs, wherein each Device DCN including an I/O interface coupled with a field device for single channel input or output, wherein each Device DCN is operatively connected to the Layer 3 switched Ethernet IP network, wherein each Device DCN includes an embedded operating system to execute one or more device applications and host a software runtime, wherein the plurality of Device DCNs provide distributed control of the field devices connected thereto; and
   a plurality of Application DCNs, wherein each of the plurality of Application DCNs is operatively connected to the Layer 3 switched Ethernet IP network, wherein each of the Application DCNs includes a centralized advanced application of the distributed control system to provide centralized control and hosts a software runtime;
   wherein each of the plurality of Device DCNs is communicatively coupled to at least one of the plurality of Device DCNs and Application DCNs through the Layer 3 switched Ethernet IP network, wherein each of the plurality of Application DCNs is communicatively coupled to at least one of the plurality of Device DCNs and Application DCNs through the Layer 3 switched Ethernet IP network, wherein the software runtime is configured to selectively provide control application level communication and function block execution services, and wherein the software runtime is configured to use a standard set of Control and I/O function blocks, whereby a plurality of the Device DCNs and the Application DCNs implement one or more distributed control strategies by communicating via through the Layer 3 switched Ethernet IP network.

2. The system of claim 1, wherein each of the plurality of Device DCNs includes a system on a chip including the embedded operating system operable to execute one or more device applications and host the software runtime.

3. The system of claim 2, wherein the one or more device applications include a device historian and a loop performance monitor.

4. The system of claim 1, wherein the Device DCNs include I/O interfaces for one or more protocols.

5. The system of claim 1, wherein at least some of the plurality of Device DCNs include a wireless gateway interface.

6. The system of claim 1, wherein each of the plurality of Application DCNs include a general purpose computer including a general purpose operating system operable to execute one or more advanced applications and the software runtime.

7. The system of claim 1, wherein the Layer 3 switched Ethernet IP network is adapted to provide VLAN routing and Quality of Service.

8. The system of claim 6, wherein the one or more advanced applications include applications for multi variable control, real-time optimization, procedural control, batch control, human machine interfacing, asset management, or warning.

* * * * *